3,279,932
HIGH TEMPERATURE ELECTRICAL
INSULATING MATERIAL
John A. Earl, Alhambra, Calif., assignor, by mesne assignments, to Physical Sciences Corporation, a corporation of California
No Drawing. Filed Aug. 3, 1962, Ser. No. 214,529
9 Claims. (Cl. 106—48)

This invention relates to a material for providing electrical insulation and more particularly relates to a material for retaining its properties of electrical insulation even at considerably elevated temperatures. The invention is especially adapted to provide a seal with the electrical conductors even at the elevated temperatures while maintaining properties of electrical insulation at such temperatures.

As scientific achievement progresses, equipments such as measuring instruments are required to operate at progressively elevated temperatures. For example, equipments are now required to operate at elevated temperatures as high as 2,000 degrees Fahrenheit to perform various functions such as to provide electrical measurements. In order to provide such electrical measurements with some accuracy, the impedances of various electrical components in the equipment and the impedances between different electrical components in the equipment have to be maintained with some precision at particular values. One of the requirements for maintaining the impedances of the members and between the members at the proper values is to provide electrical insulation which will have a high resistivity over an extended range of temperatures. The electrical insulation should also have properties of providing a seal between different electrical elements so that leakages of electrical current cannot occur between the elements.

Various attempts have been made in the past to provide a satisfactory electrical insulation at elevated temperatures. The attempts have been unsatisfactory for several reasons. One reason has been that the electrical resistivity of the materials of the prior art decreases materially as the temperature of the material is raised. This has been especially true as the material has aged as a result of successive increases and decreases in the temperature of the material through successive cycles of operation. Another disadvantage has resulted from the fact that the insulating material has not provided a seal between the electrical elements insulated by the material as the temperature of the electrical elements and the insulating material has been raised. This has caused arcing to occur between the electrical elements at the elevated temperatures, especially since the resistivity of the insulated material has decreased at the same time that the hermetic seal of the insulating material with the electrical elements has become broken.

This invention provides an insulating material which overcomes the above disadvantages. The material has a high electrical resistivity at elevated temperatures such as 1800 degrees Fahrenheit. For example, when the electrical insulation constituting this invention is subjected to a potential of approximately 1000 volts D.C., the insulating material has an electrical resistivity of approximately $1.2 \times 10^{12}$ ohms at ambient room temperature such as 70 degrees Fahrenheit and has an electrical resistivity of approximately $6 \times 10^5$ ohms at 1800 degrees Fahrenheit. The insulating material constituting this invention is also advantageous since it forms a hermetic-tight seal with various metals which are used at elevated temperatures. For example, when the insulating material provides a seal with a metal designated as "Inconel," the insulating material has a helium-leak rate which is less than $1 \times 10^{-9}$ cubic centimeters of helium/second. The insulating material constituting this invention is made by a novel method and is provided with a novel combination of elements and with a novel percentage by weight of the different elements in the combination. The insulating material is adapted to be used in an electrical connector which lives at an ambient temperature of approximately 1800 degrees Fahrenheit and which is helium leak-tight and provides the necessary electrical insulation between different elements in the electrical connector at such elevated temperatures.

The material constituting this invention is preferably formed from the materials specified in Table A and in the percentages of weight specified in that table to provide a preferred formula:

Table A

| Material: | Percentage by weight |
|---|---|
| $CaCO_3$—Calcium carbonate | 35.50 |
| $MgO$—Magnesium oxide | 4.80 |
| $Al_2O_3$—Aluminum oxide | 4.80 |
| $H_3BO_3$—Boric acid | 14.00 |
| $SiO_2$—Silicon dioxide | 21.70 |
| $TiO_2$—Titanium dioxide | 19.20 |

Preferably the materials specified in Table A are of a high purity free from traces of alkalis so as to obtain a high resistivity in the insulating material which is finally produced by the process forming a part of this invention. One reason for including materials of high purity in the mixture is to avoid primarily the inclusion of soda or potash in the insulating material which is finally produced. For example, soda having a percentage by weight as low as 0.01% would tend to reduce the resistivity of the insulating material constituting this invention. Such a reduction in resistivity would be especially true at high temperatures such that the insulating material would be ineffective in providing electrical insulation between a pair of electrical conductors.

As a first step in the process constituting this invention, the different elements specified in Table A are ground and are thoroughly mixed. The resultant mixture is smelted at a relatively high temperature such as approximately 2300 degrees Fahrenheit so as to produce a material having the relative percentages of oxides and silicates by weight as specified in Table B:

Table B

| Material: | Percentage by weight |
|---|---|
| $CaO$—Calcium oxide | 25.4 |
| $MgO$—Magnesium oxide | 6.1 |
| $Al_2O_3$—Aluminum oxide | 6.1 |
| $B_2O_3$—Boron oxide | 10.1 |
| $SiO_2$—Silicon dioxide | 27.7 |
| $TiO_2$—Titanium dioxide | 24.6 |

The mixture specified in Table B is quenched in water to a relatively low temperature such as an ambient temperature of approximately 70 degrees Fahrenheit, thus fracturing the mass into small particles, and is subsequently dried as in an oven at a relatively moderate temperature at approximately 250 degrees Fahrenheit. The mixture specified in Table B is then pulverized to produce particles which are separated into different sizes One reason for classifying the particles into different sizes is to facilitate the pressing of the material by mixing the particles of different sizes. The particles of different sizes are mixed with a binder in a suitable ratio such as approximately 10% of binder by weight to approximately 90% by weight of the mixture specified in Table B. By way of illustration, a polyvinyl may be ground and dried for use as the binder. As another example, a stearic acid heated to a melting temperature may also be used as the binder.

Particles of the mixture of the binder and the material specified in Table B may be preformed into beads by pressing together the binder and such material. The preformed particles are then heated at a suitable temperature such as 800 to 900 degrees centigrade for a suitable length of time such as one hour to remove the binder. As will be appreciated, the binder is primarily used to preform the beads and is not present in the insulating material as finally used. The material produced after heating from 800 to 900 degrees centigrade constitutes the insulator of this invention. This insulator is in a form which is ready to be sintered for the purpose of hardening and sizing of the preforms. This can now be fused to metallic elements at an elevated temperature such as 2000 degrees Fahrenheit to 2100 degrees Fahrenheit for a suitable period of time such as approximately 20 minutes.

It will be appreciated that only certain metals can be used as the electrical conductors because of the elevated temperatures to which the conductors may be subjected. One metallic material capable of being used at elevated temperatures is designated by the trademark "Inconel." This material has a composition by weight of approximately 75% nickel, 15% chromium, 7% iron and 2% titanium. Another metallic material capable of being used at elevated temperatures such as 2200 to 2300 degrees Fahrenheit is designated as "Rene 41" and is provided with a composition by weight of approximately 18 to 20% of chromium, 5% of iron, 0.12% of calcium, 0.5% of silicon, 10 to 12% of cobalt, 0.1% of of manganese, 3.0 to 3.3% of titanium, 9.0 to 10.5% of molybdenum, 1.4 to 1.6% of aluminum, and the balance of nickel.

As is well known, various materials used in forming ceramic insulators may be divided into three categories—glasses, glass formers and glass modifiers. The inclusion of particular materials in individual glasses is somewhat definite because of the strong properties exhibited by these materials. The inclusion of other materials in individual ones of the glasses is somewhat arbitrary since the properties of such materials are not so distinct that they can be considered with authority as being in one class.

In general, the glass modifiers may be considered as having a chemical formula which may be designated as $R_2O$ or $RO$, where R indicates the element forming a compound with oxygen (O). The glass modifiers may be considered as having alkaline properties and the properties of a base. In the material constituting this invention, calcium oxide and magnesium oxide may be considered as glass modifiers. These materials, both listed in Tables A and B, serve as fluxes in the mixture. They are advantageous in tending to increase the resistivity at high temperatures of the resultant mixture constituting this invention and in tending to increase the melting temperature of the mixture. The magnesium oxide is further advantageous in that it helps to bring the calcium oxide into the solution during the time that the initial mixture is being smelted at the elevated temperatures such as approximately 2300 degrees Fahrenheit. The magnesium oxide also has characteristics of a high resistivity versus temperature.

The glass formers may generally be designated by the chemical formula $R_2O_3$ where R indicates the element forming the compound with the oxygen. The glass formers are intermediate in chemical and physical properties to the glass modifiers and the glasses. For example, the glass formers may react chemically with either acidic or alkaline materials. Boron oxide and aluminum oxide, both listed in Tables A and B, may be considered as glass formers. The aluminum oxide is advantageous because it increases the viscosity of the mixture even at the elevated temperatures such as approximately 1800 degrees Fahrenheit. Since the aluminum oxide will not flow at the elevated temperatures it facilitates the stiffness of the insulating material constituting this invention. This is desirable in obtaining the production of a helium leak-tight seal by the insulating material at the elevated temperatures.

The glasses may be considered as having acidic properties and as being provided with a chemical formula of $RO_2$ or $RO_3$, where R is the element forming the glass compound with the oxygen. Silicon dioxide and titanium dioxide, both listed Tables A and B, may be considered as glasses. Silicon dioxide is normally used as the glass in a ceramic insulating material. The titanium dioxide is included because it tends to facilitate the proper operation of the insulating material at high temperatures and also because it tends to reduce the glassy characteristics of the ceramic material. As will be seen, the proportion of titanium dioxide in the mixture is relatively high in comparison to the proportion of silicon dioxide when considered in relationship to the proportions of silicon dioxide and other glasses in the insulating materials of the prior art.

It will be appreciated that other compounds can be used in addition to, or in place of, the compounds specified in Tables A and B. For example, barium oxide can be used in place of calcium oxide if an insulating material having a reduced resistivity can be used. As another example, lanthanum oxide ($La_2O_3$) may be substituted for aluminum oxide, and cerium dioxide ($CeO_2$) may be substituted for titanium dioxide. However, an insulating material with decreased resistivity results from the substitution of cerium dioxide for titanium dioxide. Cobalt oxide in a range of approximately 0.5% to 5% can also be added if an insulating material having an increased adherence to the metallic elements is desired. However, the cobalt oxide will tend to produce an insulating material with a resistivity somewhat reduced relative to that obtained from the mixture specified in Tables A and B.

It will also be appreciated that the proportions by weight of the different materials specified in Tables A and B is only by way of illustration and that different proportions of such materials may also be used without departing from the scope of the invention. For example, the different materials may have ranges of proportions by weight as follows:

| Material: | Range of proportions by weight |
|---|---|
| Calcium oxide (CaO) | 20%–30% |
| Magnesium oxide (MgO) | 5%–7% |
| Aluminum oxide ($Al_2O_3$) | 3%–7% |
| Boron oxide ($B_2O_3$) | 7%–14% |
| Silicon dioxide ($SiO_2$) | 20%–32% |
| Titanium dioxide ($TiO_2$) | 20%–32% |

The insulating material constituting this invention has been found to be advantageous after subjecting the material to various tests. For example, the material has been cycled 30 times between ambient room temperature of approximately 70 degrees Fahrenheit and elevated temperatures of approximately 1800 degrees Fahrenheit where each cycle has had a time duration of approximately 1 hour. The material has also been cycled 3 times between approximately 70 degrees Fahrenheit and 1800 degrees Fahrenheit where each cycle has had a time duration of approximately 15 hours. The material has also been subjected for 1 hour at approximately 1800 degrees Fahrenheit and then has been subjected for an additional hour at approximately —325 degrees Fahrenheit in an environment of liquid nitrogen. The temperature of the insulating material has been subsequently returned to approximately 1800 degrees Fahrenheit for one hour and has been finally returned to ambient room temperature of approximately 70 degrees Fahrenheit. After all of the tests specified in this paragraph, the insulating material has had an electrical resistance at ambient room temperature of approximately $1.2 \times 10^{12}$ ohms and an electrical resistance at 1800 degrees Fahrenheit of approximately $6.5 \times 10^5$ ohms when an electromotive force of approximately 1000 volts D.C. has been applied. The leak rate of the material has also been found to be better than $1 \times 9^{-9}$ cubic centimeters of helium per second after the material has been subjected to all of this shocking.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:
1. In combination in a ceramic material having properties of a high electrical insulation of at least $6 \times 10^5$ ohms over an extended range of temperatures to approximately 1800 degrees Fahrenheit:
    (a) the oxide of calcium in the range of approximately 20 to 30% by weight,
    (b) the oxide of magnesium in the range of approximately 5 to 7% by weight,
    (c) the oxide of aluminum in the range of approximately 3 to 7% by weight,
    (d) the oxide of boron in the range of approximately 7 to 14% by weight,
    (e) the oxide of silicon in the range of 20 to 32% by weight, and
    (f) the oxide of titanium in the range of approximately 20 to 32% by weight.
2. In combination in a ceramic material having properties of electrical insulation over an extended range of temperatures to approximately 1800 degrees Fahrenheit:
    (a) at least one material from the group consisting of the oxides of calcium and barium in about 20% to 30% by weight,
    (b) at least one material from the group consisting of the oxides of titanium and cerium in about 20% to 32% by weight,
    (c) the oxide of silicon in about 20% to 32% by weight, and
    (d) at least one material from the group consisting of the oxides of aluminum and lanthanum in about 3% to 7% by weight.
3. The combination set forth in claim 2 including the oxide of magnesium in the range of approximately 5% to 7% by weight and the oxide of boron in the range of approximately 7% to 14% by weight.
4. In combination in a ceramic material having properties of electrical insulation of at least $6 \times 10^5$ ohms over an extended range of temperatures to approximately 1800 degrees Fahrenheit:
    (a) calcium oxide having a percentage of approximately 25.4% by weight,
    (b) magnesium oxide having a percentage of approximately 6.1% by weight,
    (c) aluminum oxide having a percentage of approximately 6.1% by weight,
    (d) boron oxide having a percentage of approximately 10.1% by weight,
    (e) silicon dioxide having a percentage of approximately 27.7% by weight, and
    (f) titanium dioxide having a percentage of approximately 24.6% by weight.
5. In combination in a ceramic material having properties of electrical insulation of at least $6 \times 10^5$ ohms over an extended range of temperatures to approximately 1800 degrees Fahrenheit:
    (a) a least one glass modifier from the group consisting of the oxides of calcium and barium in the range of approximately 20% to 30% by weight,
    (b) at least one glass from the group consisting of the oxides of titanium and cerium in the range of approximately 20% to 32% by weight,
    (c) at least one glass former from the group consisting of the oxides of aluminum and lanthanum in the range of approximately 20% to 30% by weight,
    (d) the oxide of silicon in the range of approximately 20% to 32% by weight, and
    (e) the oxide of boron in the range of approximately 7% to 14% by weight.
6. A method of producing an insulating material having properties of electrical insulation over an extended range of temperatures, including the steps of:
    (a) mixing the following materials in the following percentages by weight

| Material: | Percentage by weight |
|---|---|
| Calcium oxide | 25.4 |
| Magnesium oxide | 6.1 |
| Aluminum oxide | 6.1 |
| Boron oxide | 10.1 |
| Silicon dioxide | 27.7 |
| Titanium dioxide | 24.6 |

(b) smelting the mixture at an elevated temperature in the order of approximately 2300 degrees Fahrenheit,
    (c) quenching the smelted mixture to approximately ambient room temperature,
    (d) mixing a binder into the smelted mixture, and
    (e) heating the binder and the smelted mixture to a temperature in the order of approximately 800 degrees centigrade to drive away the binder.
7. The method set forth in claim 6 in which the smelted mixture is dried after being quenched and in which the binder and the smelted mixture are pressed together into beads before the binder and the smelted mixture are heated to drive away the binder.
8. A method of producing an insulating material having properties of electrical insulation over an extended range of temperatures, including the steps of:
    (a) mixing the following materials in the following percentages by weight:
        (1) at least one material from the group consisting of the oxides of calcium and barium in the range of approximately 20% to 30% by weight,
        (2) at least one material from the group consisting of the oxides of titanium and cerium in the range of approximately 20% to 32% by weight,
        (3) the oxide of silicon in the range of approximately 20% to 32% by weight,
        (4) at least one glass former from the group consisting of the oxides of aluminum and lanthanum in the range of approximately 3% to 7% by weight,
        (5) the oxide of boron in the range of approximately 7% to 14% by weight,
        (6) the oxide of magnesium in the range of approximately 5% to 7% by weight,
    (b) smelting the mixture at an elevated temperature,
    (c) quenching the smelted mixture to approximately ambient room temperature,
    (d) mixing a binder into the smelted mixture, and
    (e) heating the binder and the smelted mixture to a moderate temperature to drive away the binder.
9. The method set forth in claim 8 in which the binder and the smelted mixture are pressed together before being heated to drive away the binder.

(References on following page)

References Cited by the Examiner

UNITED STATES PATENTS

| | | | |
|---|---|---|---|
| 2,701,208 | 2/1955 | Blau | 106—47 |
| 2,829,062 | 4/1958 | Bennett et al. | 106—48 |
| 2,891,914 | 6/1959 | Fenity et al. | 252—520 |
| 2,972,543 | 2/1961 | Beals et al. | 106—49 |
| 3,060,041 | 10/1962 | Loewenstein | 106—54 |
| 3,069,294 | 12/1962 | Davis | 106—54 |
| 3,088,921 | 5/1963 | Heischman | 252—520 |

FOREIGN PATENTS

| | | |
|---|---|---|
| 12,461 | 3/1928 | Australia. |
| 513,928 | 10/1939 | Great Britain. |

TOBIAS E. LEVOW, *Primary Examiner.*

H. McCARTHY, *Assistant Examiner.*